Patented May 15, 1945

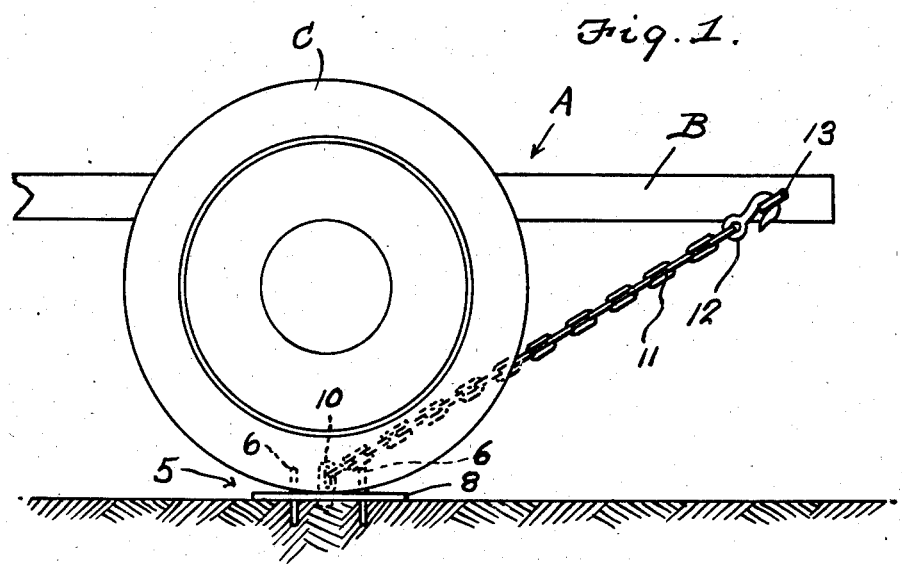
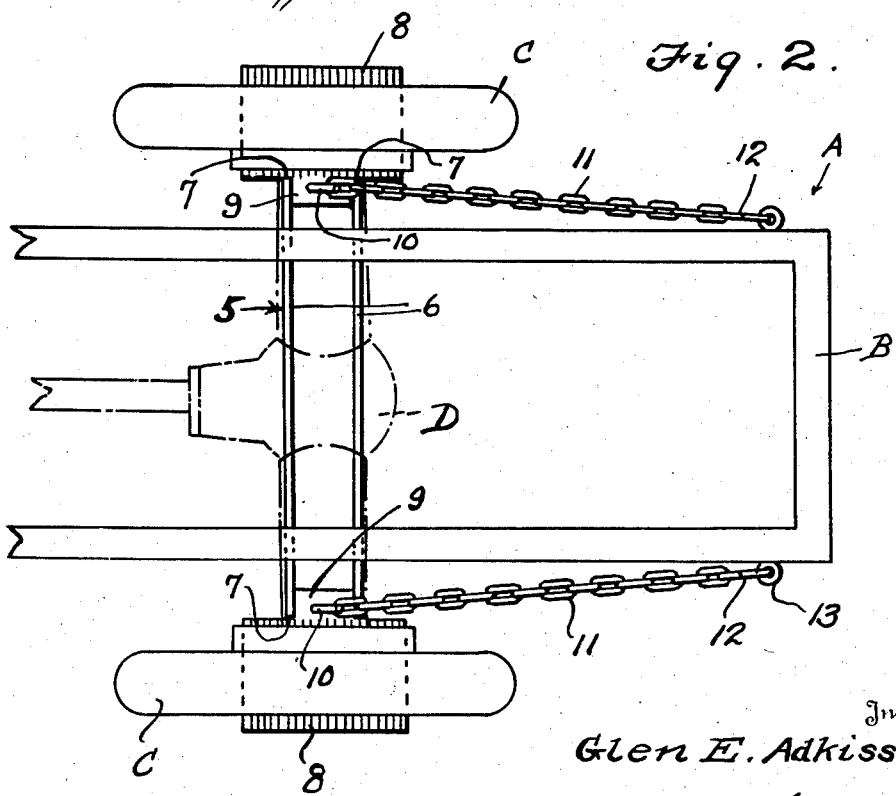

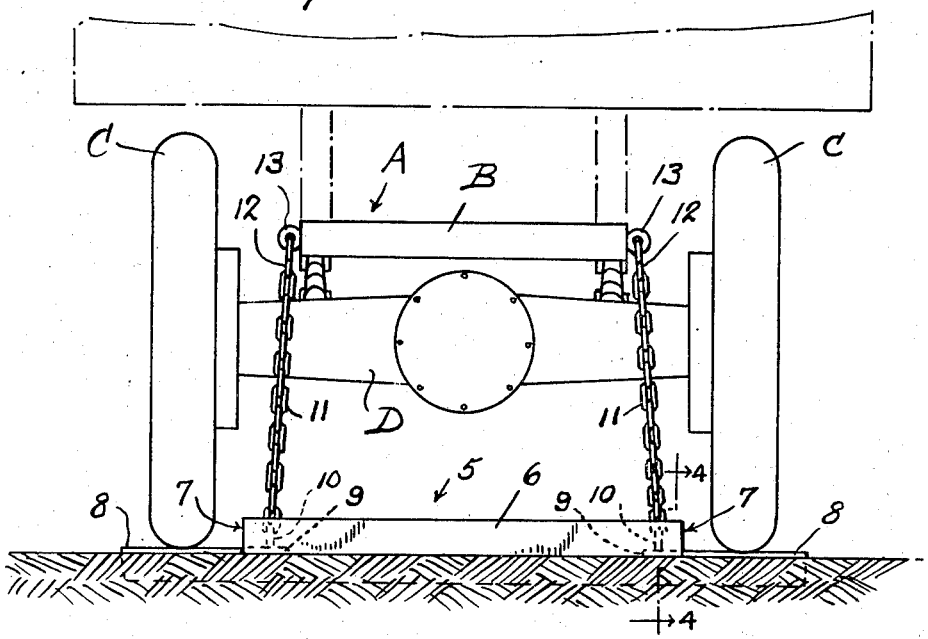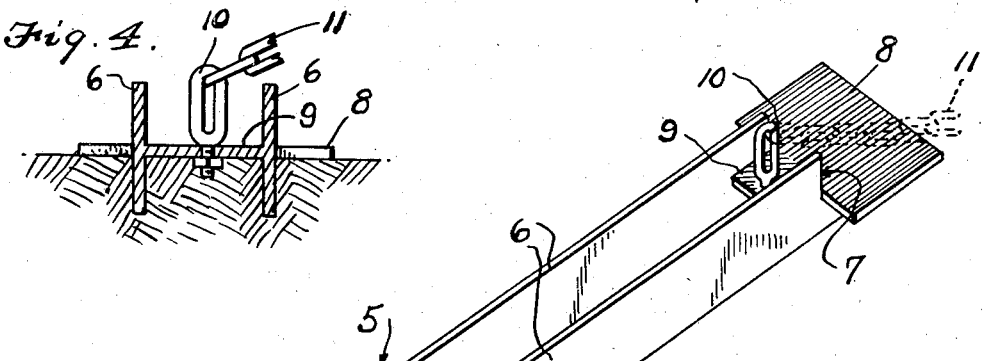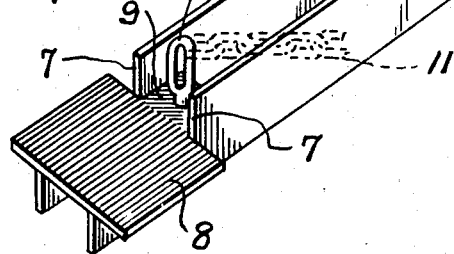

2,376,318

UNITED STATES PATENT OFFICE 2,376,318

VEHICLE ANCHOR DEVICE

Glen E. Adkisson, Broken Bow, Okla.

Application August 1, 1942, Serial No. 453,247

6 Claims. (Cl. 188—4)

This invention relates to the official class of brakes and more particularly chuck blocks for wheels of vehicles.

The primary object of this invention resides in the provision of means whereby vehicles, such as winch trucks, wheeled military field pieces and the like, are anchored to the ground.

Another object of this invention resides in the provision of an anchor for winch trucks whereby the same will be secured against the pull on the cables thereof.

A further object of this invention resides in the provision of an anchor for wheeled military pieces adapted to prevent rearward movement thereof under the recoil of the guns carried thereby.

A still further object of this invention resides in the provision of an anchor for winch trucks and the like adapted to be inserted in the ground by the weight of the trucks.

With these and other objects in view this invention resides in certain novel features of construction and arrangement of elements to be hereinafter more particularly set forth in the specification, illustrated in the accompanying drawings and pointed out in the appended claims and, while this disclosure depicts my present conception of the invention, the right is reserved to resort to such changes in construction and arrangement of elements as come within the spirit of the invention.

In the accompanying drawings forming a part of this application:

Fig. 1 is a side view of the rear portion of a winch truck showing this invention associated in operative relation therewith.

Fig. 2 is a plan view thereof showing the vehicle differential housing in dotted lines to better illustrate the anchor device.

Fig. 3 is a rear view thereof.

Fig. 4 is an enlarged sectional view taken approximately on line 4—4 of Fig. 3.

Fig. 5 is a perspective view of the anchor device showing the chains in dotted lines.

In the present illustration of this invention the letter A designates the rear portion of a winch truck or other similar vehicle which, among other well known elements, consists of a frame B mounted on wheels C connected in the usual manner by a differential housing D.

The anchor device forming the subject matter of this invention is designated, in general, by the numeral 5 and comprises laterally extending and upright spaced plates 6 having the upper portions of their ends cut out as indicated by the numeral 7 to form seats upon which are welded or otherwise secured wheel accommodating platforms 8.

The platforms 8 are of substantially T-shape configuration in plan and have their stem portions 9 disposed between and welded to the plates 6 to form cross braces for supporting eye-bolts 10 or the like.

Secured to the eye-bolts 10 are chains 11 or other suitable flexible elements which are adapted to be connected at their free ends to stationary portions of the vehicle, the connection, in the instant case, being through the instrumentality of hooks 12 carried by the chain and engaging eye-bolts 13 secured to the frame 3 and, while this form of connection is herein adopted, it is to be understood other conventional fastening means may be employed just so the invention can be successfully practiced as set forth.

Where the anchor device is to be used for securing a winch truck against the pull on its cables, the same is disposed on the ground with the platforms thereof in the path of the truck wheels, whereupon the wheels are run thereon to press the lower portions of the upstanding plates 6 in the ground and, with the weight of the truck resting on the platforms bearing on the surface of the ground, the chains 11 are secured to the eye-bolts 13 or other points on the truck rearwardly of the wheels to prevent rearward movement of the truck by the cables thereon, however, where the pull on the cables is from the rear of the truck, the chains are secured forwardly of the wheels.

In use of the anchor device for wheeled military pieces carrying guns, the same is disposed beneath the wheels thereof in a manner as heretofore set forth but the chains 11 are extended rearwardly of the wheels and secured to a stationary portion of the military piece in any manner constituting an equivalent to the aforesaid hook and eye-bolts. In order to prevent slippage of the wheels on the platforms 8 their upper surfaces may be roughened in any well-known manner.

With this invention fully set forth, it is manifest that an anchor device is provided to securely hold vehicles of the aforesaid types to the ground and, through the simplicity of the same, it can be cheaply manufactured and placed in operation with positive assurance of successful operation.

Having thus described my invention what I claim and desire to protect by Letters Patent is:

1. The combination with a winch truck including a rear pull cable, platforms supporting certain opposite wheels of the truck, laterally disposed upstanding plates supporting the platforms at their ends and having their lower portions embedded in the ground, and flexible elements extending rearwardly from the platforms with their free ends removably connected to stationary portions of the truck.

2. The combination with a winch truck including a forward pull cable, platforms supporting certain opposite wheels of the truck, laterally disposed upstanding plates supporting the platforms at their ends and having their lower portions embedded in the ground, and flexible elements extending forwardly from the platforms with their free ends removably connected to stationary portions of the truck.

3. An anchor device of the character set forth comprising, spaced upright plates having the upper portions of their ends cut out, substantially T-shape platforms secured on the cut out portions of the plates and having their stem portions disposed between and secured to the plates, eye-bolts secured to the stem portions of the platforms, chains secured to the eye-bolts, and fastening elements secured to the free ends of the chains.

4. An anchor device of the character described comprising, wheel supporting platforms, spaced upright plates supporting the platforms, and means connecting the anchor device to that vehicle supported by the platforms.

5. An anchor device of the character set forth comprising, spaced parallel plates having the upper portions of their ends cut out, substantially rectangular shape platforms secured on the cut out portions of the plates on a horizontal plane below that occupied by the upper edges of the plates, and a vehicle attaching element secured to the anchor.

6. An anchor device of the character set forth comprising, substantially rectangular platforms disposed in spaced relation, spaced parallel plates supporting the platforms in rigid relation and having a certain area thereof extending laterally below that horizontal plain occupied by the platforms and a certain other area extending laterally above the horizontal plain occupied by the platforms, and a vehicle attaching element secured to the anchor.

GLEN E. ADKISSON.